United States Patent [19]

Hong

[11] Patent Number: 5,442,494
[45] Date of Patent: Aug. 15, 1995

[54] VIDEO CASSETTE RECORDER POWER SUPPLY CAPABLE OF BREAKING SUPPLY VOLTAGE TO AUDIO APPARATUS

[75] Inventor: Jae-Gyoo Hong, Seoul, Rep. of Korea

[73] Assignee: Daewoo Electronics Co., Ltd., Seoul, Rep. of Korea

[21] Appl. No.: 123,645

[22] Filed: Sep. 17, 1993

[30] Foreign Application Priority Data

Sep. 18, 1992 [KR] Rep. of Korea ............ 92-17737

[51] Int. Cl.6 .................................... G11B 15/12
[52] U.S. Cl. ............................................. 360/61
[58] Field of Search .............. 360/10.1, 10.3, 19.1, 360/33.1, 61, 62; 358/312

[56] References Cited

U.S. PATENT DOCUMENTS 3,843,838 10/1974 Wanek .
3,973,178 8/1976 Pyles .................... 318/673
4,124,873 11/1978 Satoh et al. .............. 360/62
5,280,632 1/1994 Jung-Gon ................ 455/70

Primary Examiner—Aristotelis Psitos
Assistant Examiner—Won Tae C. Kim
Attorney, Agent, or Firm—William F. Pinsak

[57] ABSTRACT

Disclosed herein is an improved VCR power supply capable of selectively breaking a dc supply voltage to an audio apparatus during its audio mute state set by a control unit. The improved power supply comprises a first transistor coupled to an upstream of the audio apparatus for selectively blocking the supply voltage; and a second transistor, in response to an audio mute control signal from the control unit, for controlling the selective breaking operation of the first transistor, thereby achieving a low consumption of electrical energy during the audio mute state.

1 Claim, 1 Drawing Sheet

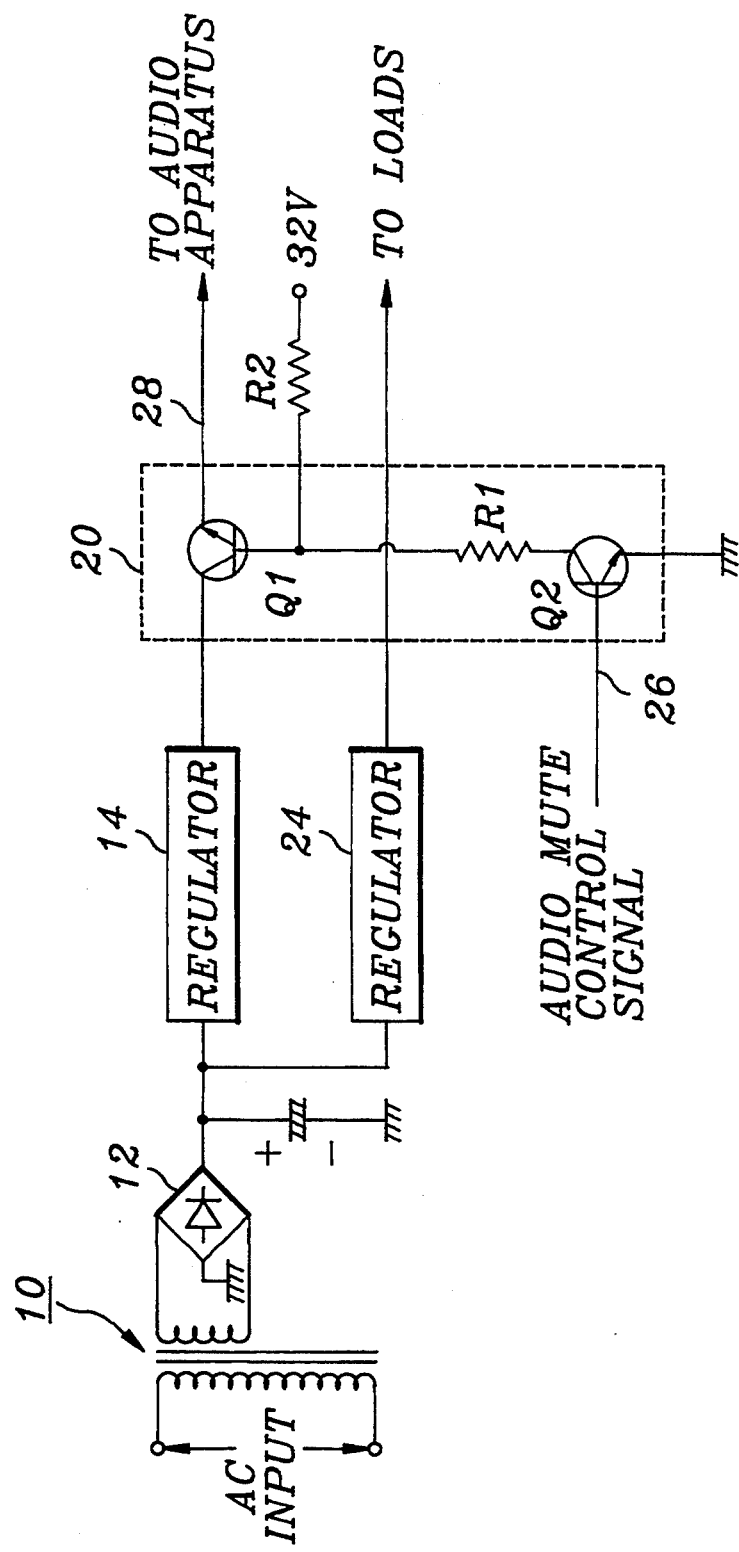

VIDEO CASSETTE RECORDER POWER SUPPLY CAPABLE OF BREAKING SUPPLY VOLTAGE TO AUDIO APPARATUS

FIELD OF THE INVENTION

The present invention relates to an improved video cassette recorder capable of selectively controlling certain operating dc voltages; and, more particularly, to an improved power supply adapted for use in a video cassette recorder to selectively break a supply voltage to an audio apparatus during its audio mute state so as to save power consumption.

BACKGROUND OF THE INVENTION

A conventional power supply rectifies its ac input to supply a dc voltage to a load. A video cassette recorder ("VCR") has several power supplies or rectifiers incorporated therein to generate dc operating voltages. For instance, a 12 V dc operating voltage is utilized in such loads as an audio apparatus, a capstan motor and the like built in the VCR. The audio apparatus may be dictated to block the flow of audio signals therefrom to a loudspeaker, which state is sometimes called "audio mute". The audio mute state is set by the action of an appropriate control unit which issues an audio mute control signal to the audio apparatus so as to mute annoying noises or sounds which can be heard, e.g., when the VCR is in a certain operating mode such as Fast Forward, Still, Slow, Que and Review.

In the audio mute state, the output audio signal from the audio apparatus is blocked; however, the dc operating voltage from its power supply continues to be supplied to the audio apparatus, resulting in a waste of electric energy. Further, the capstan motor may consume an extra electric power so as to, e.g., accelerate the tape travel speed during, e.g., Fast Forward operating mode. Thus, in order to cope with an uneven power supply requirement by the capstan motor during said certain operating mode mentioned above due to abrupt changes in the tape travel speed, the power supply should be preferably designed to possess an extra capacity sufficient to satisfy the additional power consumption requirement of the capstan motor. Therefore, it is desirable to save the electric energy which may be otherwise wasted by the audio apparatus so that the saved energy can be used to accommodate the extra power requirement demanded by the capstan motor during that certain operating mode which is accompanied by an audio mute state.

SUMMARY OF THE INVENTION

It is, therefore, an object of the invention to provide a power supply adapted for use in a video cassette recorder to block a supply voltage to an audio apparatus incorporated therein during its audio mute state.

It is another object of the invention to provide a power supply which is capable of saving electrical energy during an audio mute state.

It is a further object of the invention to provide a power supply to effectively satisfy uneven power consumption requirements of a caps tan motor built in the VCR during an audio mute state.

In accordance with the invention, there is provided an improved power supply adapted for use with an audio apparatus built in a VCR, comprising a first switching transistor, coupled between the audio apparatus and a regulator for supplying an operating voltage to the audio apparatus, which serves to selectively break the operating voltage; and a second switching transistor which controls, in response to an audio mute control signal, the switching operation of the first switching transistor.

BRIEF DESCRIPTION OF THE DRAWING

The above and other objects and features of the present invention will become apparent from the following description given with reference to the accompanying drawing which shows a circuit diagram, partly in a block form, of a preferred embodiment of the novel power supply in accordance with the invention.

DETAILED DESCRIPTION OF THE PREFERRED EMBODIMENT

Referring to the drawing, there is shown a power supply which includes conventional components such as a power transformer 10, a rectifier module 12 and a pair of regulators 14 and 24 together with an arrangement 20 for blocking the flow of a supply voltage from the regulator 14 to an audio apparatus(not shown). The power transformer 10 adjusts the ac input so that an appropriate amplitude is achieved. The rectifier module 12 converts the sinusoidal input waveform voltage from the transformer 10 into a unidirectional waveform(pulsating dc signal) and smoothes the waveform by eliminating the ac components. Each of the regulators 14 and 24 connected to the output of the rectifier module 12 in parallel serves to maintain a constant voltage level for loads such as the audio apparatus independent of load conditions or variations in the amplitude of the ac input. The regulators 14 and 24 produce regulated dc operating voltages, for example, 12 V, for the audio apparatus, capstan motor and the like.

Block 20 in a dotted line designates the arrangement for blocking the flow of the operating voltage from the regulator 14 to the audio apparatus, which includes a first and a second switching transistors Q1 and Q2. The first transistor Q1 is coupled between the regulator 14 and the audio apparatus and serves to selectively block the operating voltage from flowing to the audio apparatus, whose collector is connected to the output end of the regulator 14, whose emitter is connected to an upstream of the audio apparatus and whose base is connected to the second transistor Q2 through a bias resistor R1. The second transistor Q2 controls the operation of the transistor Q1 and has a collector connected to the base of the first transistor, an emitter connected to ground and a base connected to a control unit (not shown) which provides an audio mute control signal with a logic high through a line 26.

The voltage blocking arrangement 20 further comprises a bias resistor R2 whose one end is connected between the base of the first transistor Q1 and the resistor R1 and whose the other end is linked to voltage supply 32 V. The resistors R1 and R2 serve as a voltage dividing circuit. Thus, when the second transistor Q2 is turned off due to a low level switching signal from the control unit, the first transistor Q1 is normally turned on so that the operating voltage from the regulator 14 can be applied to the audio apparatus.

During the audio mute state, however, the control unit provides the audio mute control signal to the base of the transistor Q2 through the line 26. When the transistor Q2 is turned on in response to the mute control signal, the first transistor Q1 becomes turned off to prevent the transfer of the operating voltage from the regulator 14 to the audio apparatus, thereby avoiding the consumption of electrical energy in the audio apparatus.

While the present invention has been shown and described with reference to the particular embodiment, it will be apparent to those skilled in the art that many changes and modifications may be made without departing from the spirit and scope of the invention as defined in the appended claims.

What is claimed is:

1. An improved video cassette recorder incorporating therein, an audio apparatus, a transformer and a regulator for supplying an operating voltage to the audio apparatus wherein the audio apparatus is capable of muting audio signal in an audio mute state in response to an audio mute control signal from a control unit, wherein the improvement comprises:

first switching means coupled between the regulator and the audio apparatus for selective breaking the operating voltage the audio apparatus, wherein the first switching means includes a first transistor having a collector connected to the regulator, an emitter connected to the audio apparatus and a base connected to a second switching means, and second switching means for controlling, in response to the audio mute control signal, the selective breaking operation of the first switching means, wherein the second switching means includes a second transistor having a collector connected to the base of the first transistor, an emitter connected to ground and a base connected to the control unit.

* * * * *